United States Patent
Houle

[15] 3,688,731
[45] Sept. 5, 1972

[54] WATER PROPELLING MEANS FOR VEHICLES

[72] Inventor: Guy J. Houle, Dollard des Ormeaux, Quebec, Canada

[73] Assignee: Maurice E. Hebert, Dollard des Ormeaux, Quebec, Canada

[22] Filed: July 6, 1970

[21] Appl. No.: 57,024

[30] Foreign Application Priority Data

March 3, 1970    Canada......................076,421

[52] U.S. Cl. ...............................................115/1 R
[51] Int. Cl. ..............................................B60f 3/00
[58] Field of Search.........................................115/1

[56] References Cited

FOREIGN PATENTS OR APPLICATIONS 1,041,401  9/1966  Great Britain.................115/1
824,031  9/1969  Canada..........................115/1

Primary Examiner—Andrew H. Farrell

[57] ABSTRACT

A vehicle having a buoyant body and one or more driven axles for transmitting a drive to traction means for supporting and propelling the vehicle on land. A cavity is provided on each side of the body about at-least one driven axle and cooperates with a centrifugal impeller wheel which is secured to the axle to thereby generate a propelling thrust to the vehicle when utilized on water.

8 Claims, 10 Drawing Figures

PATENTED SEP 5 1972 3,688,731
SHEET 1 OF 2
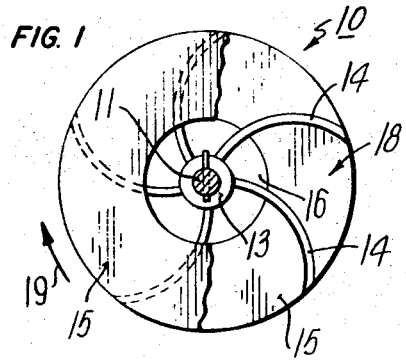
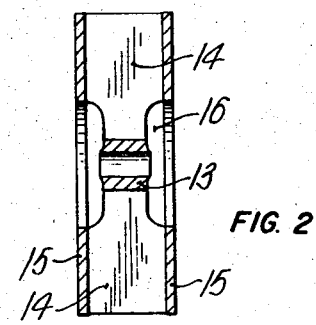
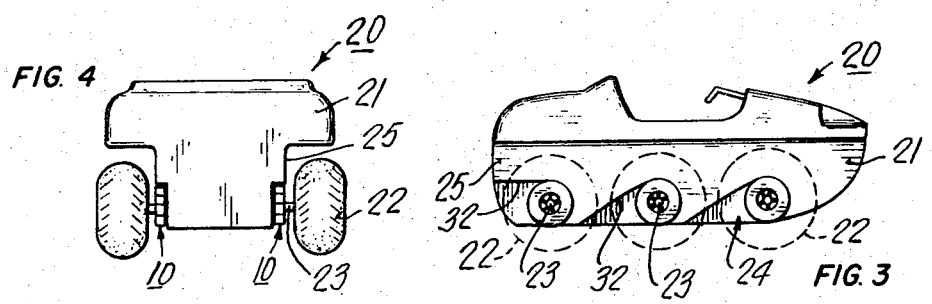
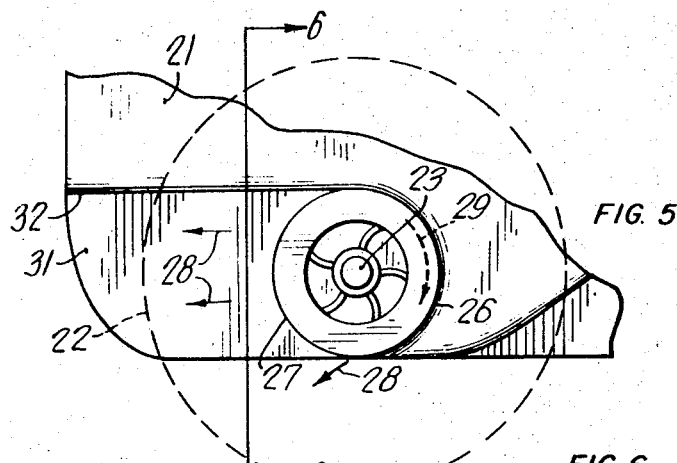
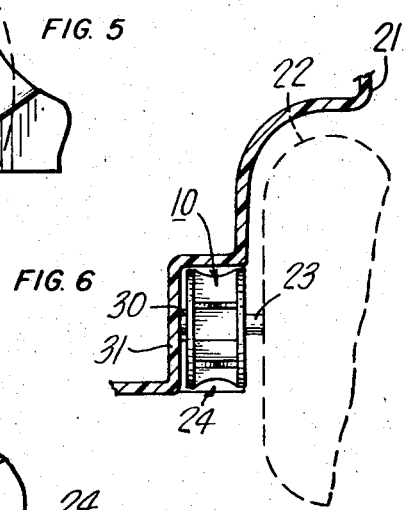
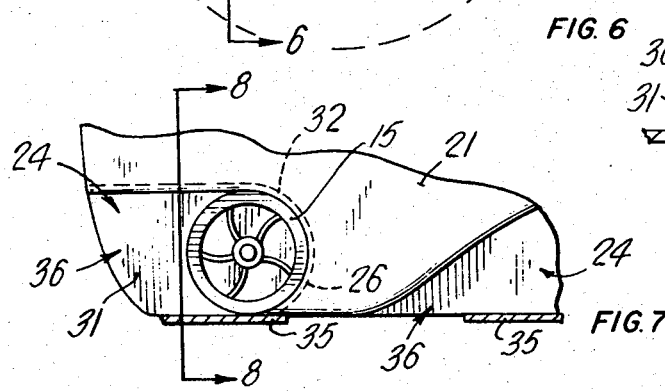

WATER PROPELLING MEANS FOR VEHICLES

This invention relates to water propelling means for use on water-going vehicles having a driven axle for driving traction means.

In the prior art known to the applicant, there is disclosed various devices to propulse track and wheel vehicles on water. However, the majority of these devices are not very effective, are too costly, bulky and difficult to manufacture because of their complexity.

It is an object of the present invention to provide one or more impeller wheels for propelling a water-going vehicle.

Accordingly, from a broad aspect, the present invention relates to a vehicle having a buoyant body and one or more driven axles for transmitting a drive to traction means. A cavity is provided in each side of the body about one or more of the driven axles for accomodating a respective centrifugal pumping wheel secured to one or more driven axle. The cavities each have an arcuate face in close proximity with a portion of the outer periphery of its respective pumping wheel an an outlet portion extending away from the pumping wheel. The pumping wheel in the cavity generates a propelling thrust to the vehicle when operated on water.

The invention will now be described with reference to the following drawings:

FIG. 1 is a fragmented side view of an impeller wheel,

FIG. 2 is a side section view of FIG. 1,

Figure 8:
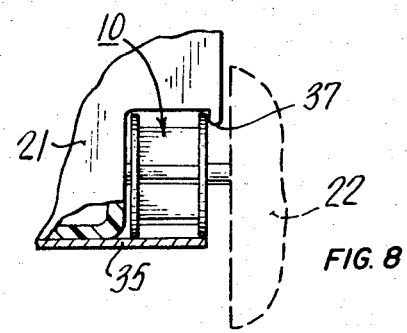
Figure 9:
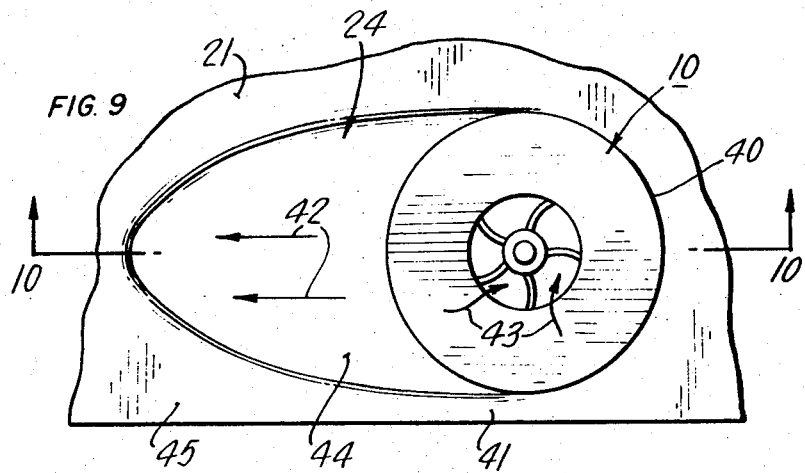
Figure 10:
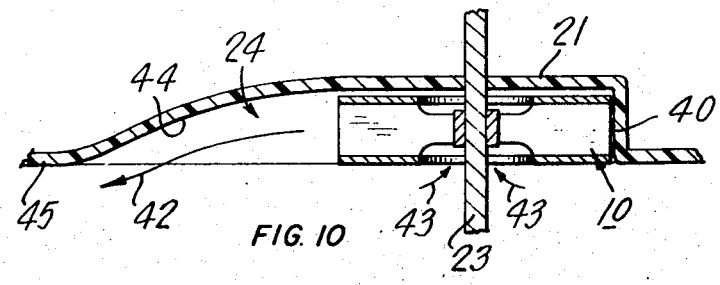

FIG. 3 is a side view of a vehicle showing impeller wheels adapted to its driven axles, FIG. 4 is a rear view of the vehicle of FIG. 3, FIG 5 is a fragmented side view of a part of FIG. 3, FIG. 6 is a view along cross-section lines V1—V1 of FIG. 5, FIG. 7 is a further fragmented side view of a part of FIG. 3, illustrating a further embodiment of the invention, FIG. 8 is a view along section lines V111—V111 of FIG. 7, FIG. 9 is a fragmented side view of a further embodiment, and FIG. 10 is a view along cross-section lines X—X of FIG. 9.

Referring now to the drawings and more particularly to FIGS. 1 and 2 there is shown generally at 10 a centrifugal pumping impeller wheel. The impeller wheel 10 is rigidly secured to a driven axle 11 by such means as a tension pin 12 treaded through the hub portion 13 of the impeller wheel 10. A plurality of arcuately extending vanes 14 are provided integraly and spaced equidistantly between the two circular side plates 15. The vanes 14 are secured at their edges to the side plates and disposed equidistantly about the hub portion 12. The side plates 15 are each provided with a circular aperture 16 near its center which is of larger diameter than the outer periphery of the hub portion 12 to thereby define an inlet port 17 on each side of the impeller wheel 10. The inlet port 17 communicates with the passages 18 defined between adjacent ones of the vanes 14.

When the impeller wheel 10 is immersed in a liquid mass such as water, a thrust is provided by driving or rotating the axle 11 in a clockwise direction, the impeller rotating in the direction of arrow 19. The water present in the immediate area adjacent the inlet port 17 is drawn into the impeller passages 18, by the rotating vanes 14, and thrown outwardly towards the outer end of the passages 18.

Referring to FIGS. 3 and 4 there is shown a wheel vehicle 20 comprising a buoyant body constructed of fiberglass or other suitable material and supported on wheels 22. The wheels 22 are each secured to a driven axle 23 for displacing the vehicle 20 on land. To steer the vehicle the wheels 22 on one side of the vehicle are slowed down or stopped while the wheels on the other side are speeded up or kept constant.

Since the drive or steering mechanism does not form part of the present invention it will not be described herein. To provide a forward thrust or propulsion of the vehicle when utilized on water, impeller wheels 10 are secured to one or more driven axles 23 on each side of the vehicle 20. The impeller wheels 10 are secured on the axle 23 between the wheels 22 and the body 21.

In order to provide a rearward thrust to propel the vehicle forward, the impellers 10 are secured in a cavity 24 which is formed in the sides 25 of the vehicle 20. The front 26 of the cavities 24 are shaped in an arc of the same curvature as the impeller wheel so that the outer periphery 27 of the impeller wheels 10 are positioned in very close proximity to the arcuate surface 26 so that the water which is thrown outwardly by the impellers 10 will not be ejected in the front but directed to the back as shown by the direction of arrows 28. The water thrown outwardly towards the front arcuate surface 26 will be drawn downwardly in the direction of arrow 29 by the vanes rotating clockwise. As shown in FIG. 6 the upper edge of the vanes 29 may define a concave curvature to permit a better flow of water in the area adjacent the front arcuate surface 26 to provide a better discharge of water in the direction of arrow 29 to the bottom of the vehicle body.

As can be seem from FIG. 3 there are three separate cavities 24 on each side of the vehicle, each of which is located about the protruding end portions of the axles 23. The depth of each cavity 24 is uniform and slightly longer than the width of the impeller wheels 10 so as to provide for insertion of the necessary spacers 30 between the impeller wheel hub portion 13 and the bottom surface 31 of the cavities 24.

Further, as shown in FIG. 3, the two front cavities 24 are shaped differently than the rear cavities 24. The upper face 32 of the front cavities each sope rearwardly and downwardly to prevent obstruction of the ejected flow of water by the wheel immediately behing it. The upper face 32 of the rear cavity is substantially parallel to the longitudinal axis of the vehicle to provide straight rearward ejection. The area between the fottom surface 31 and the upper face 32, behind the impeller wheels 10, constitute a cavity outlet portion for the water, being pumped by the impellers, to be ejected.

Referring to FIGS. 7 and 8 there is shown a further embodiment of the present invention. In order to provide a more concentrated ejected flow of water, a plate 35 may be secured under the body 21 and extend the full width of the cavities 24 and along a certain portion of its bottom opening so as to define a restricted throat portion 36 where the majority of the fluid will be ejected.

As can further be seen from FIGS. 7 and 8 the front arcuate face 26 and the upper face 32 may be recessed within the body 21 to define a lip 37 primarily in the area of the arcuate front face 26. The lip 37 prevents the water under pressure, in the front face of the cavity, to eject sideways between the outer periphery of the outer side plate 15 and the front face 26.

To provide a better supply of water at the outer inlet port 17 (the port 17 facing the wheel 22) it is preferable, although not essential that the wheel hub not shown, be concave to define a larger open area in the immediate vicinity of the outer inlet port 17. Also, because the inner side plate 15 is very close to the bottom surface 31 it is not necessary to provide an inlet port 17 in that plate as the water will have limited access to that area when the impeller is in operation.

Referring to FIGS. 9 and 10 there is shown a still further embodiment of the present invention. As shown therein, the front arcuate face 26 of the cavity 24 has the same curvature as the outer periphery of the circular side plates 15. The cavity 24 is of substantially uniform width in the area of the impeller wheel 10 and the bottom surface 44 thereof converges rearwardly and outwardly to the body side surface 45 as shown in FIG. 10. The cavity 24 is wholly within the body side surface 45 which substantially eliminates downward discharge of the water as illustrated by arrows 42. Arrows 43 indicate the direction of flow of the water being sucked into the impellers 10 and displaced thereby.

Also, although not shown, it is within the ambit of the present invention to provide the impeller wheels and cavities with a two track vehicle whereby the impellers and cavities are positioned in the body about the drive axle between each endless track.

In operation, when the vehicle 20 enters a body of water all wheels 22 continue to turn and when the vehicle starts floating the impeller wheels 10 are submerged. The clockwise rotation of the impeller wheels causes the impellers to draw-in water through the inlet ports 17 and eject it under pressure in a substantially rearward direction. This ejection is sufficient to propel the vehicle frontwards. To steer the vehicle the speed of the wheels 22 on one side is varied from that of the opposite side causing the impellers 10 on one side of the vehicle to pump faster than on the other side thereby providing a greater thrust on one side to cause the vehicle to turn.

Although not shown, it is intended to be within the ambit of the present invention to provide independent axles or shafts solely to support the impellers in cavities and transmit the drive to them.

I claim:

1. In a vehicle having a buoyant body and one or more driven axles for transmitting a drive to traction means to support and propell the vehicle on land the improvement comprising a cavity provided in each side of said body about one or more of said driven axles for accommodating a respective centrifugal pumping wheel secured to said one or more driven axle, said cavities each having an arcuate front face in close proximity with a portion of the outer periphery of its respective pumping wheel to prevent water from being discharged in the direction of said arcuate front face and an outlet portion extending away from said pumping wheel substantially adjacent said arcuate face, said pumping wheel in said cavity generating a propelling thrust through said outlet portion when said vehicle is operated on water.

2. A vehicle as claimed in claim 1 wherein said centrifugal pumping wheels are impeller wheels each comprising a hub portion having a plurality of arcuate vanes extending therefrom and two circular side plates concentrically positioned with respect to said hub portion and each secured on a respective side thereof and an aperture about the center of at least one of said side plates to provide an inlet port to the passages between said vanes.

3. A vehicle as claimed in claim 2 wherein said vanes extend from the outer surface of said hub portion and converge curvilinearly outwardly to the outer periphery of said side plates.

4. A vehicle as claimed in claim 2 wherein each said cavities define an arcuate face extending in close proximity along a portion of the outer periphery of its associated pumping wheel, said arcuate face extending across the width of said pumping wheel to thereby provide ejection of water by said pumping wheel only in a general rearward direction of said vehicle.

5. A vehicle as claimed in claim 4 wherein said cavities are of uniform width and define a front arcuate face and an outlet portion extending away from said impeller to permit the ejection of water in a general rearward and downward direction.

6. A vehicle as claimed in claim 4 wherein said cavities are of uniform width in the area of said impeller wheel and define a front arcuate face to cooperate with a portion of the outer periphery of said impeller, said cavity extending rearwardly from said arcuate face, said width decreasing in thickness from the area behind said impeller wheel to the side surface of said body.

7. A vehicle as claimed in claim 5 wherein said front arcuate face define a lip along its outer edge to prevent ejection of water between said impeller wheel outer periphery and said arcuate face, said lip extending flush with the outer side surface of said vehicle body.

8. A vehicle as claimed in claim 1 wherein said centrifugal pumping wheels are impeller wheels each having a bored hub portion, a plurality of arcuate vanes extending from said hub portion and two circular side plates centrally positioned with respect to said hub and secured on a respective side thereof, an aperture near the center of each said side plates to provide an inlet port to passages between said vanes so that when said impeller wheel is rotated in water the water will be drawn into said passages through said apertures and be ejected outwardly at the outer periphery of said wheel, said cavity defining an arcuate face extending in close proximity along a portion of the outer periphery of its associated impeller wheel and extending across both said side plates to thereby provide ejection of water by said impeller only in a general rearward direction of said vehicle.

* * * * *